United States Patent [19]

Allis

[11] Patent Number: 4,984,665

[45] Date of Patent: Jan. 15, 1991

[54] ANTI-REVERSE ACTUATOR FOR A SPINNING REEL

[75] Inventor: David Allis, Tulsa, Okla.

[73] Assignee: Zebco Corporation, Tulsa, Okla.

[21] Appl. No.: 450,517

[22] Filed: Dec. 14, 1989

[51] Int. Cl.$^5$ .............................................. A01K 89/02
[52] U.S. Cl. ......................................... 192/7; 74/576; 242/300; 188/82.3
[58] Field of Search .................... 192/7, 8 R; 242/243, 242/247, 285, 297, 298, 299, 300; 188/82.3, 82.4; 74/576

[56] References Cited

U.S. PATENT DOCUMENTS

| | | | |
|---|---|---|---|
| 2,581,648 | 1/1952 | Gienger | 74/576 |
| 3,794,264 | 2/1974 | Hull | 242/298 X |
| 4,323,203 | 4/1982 | Neufeld | 242/300 |
| 4,359,197 | 11/1982 | Neufeld | 242/300 |
| 4,492,347 | 1/1985 | Moss | 74/576 X |
| 4,735,376 | 4/1988 | Hlava | 242/247 |

Primary Examiner—Richard Lorence
Attorney, Agent, or Firm—Wood, Phillips, Mason, Recktenwald & VanSanten

[57] ABSTRACT

An anti-reverse actuator for a reel of the type having a line carrying spool, a crank assembly consisting of a crank shaft and a handle operable to rotate the crank shaft about an axis, structure responsive to rotation of the crank handle in a first direction for directing line onto the spool, a pawl mounted for movement between first and second positions, structure for blocking the pawl in the first and second positions, and structure on the crank assembly for engaging the pawl in the first position so that the pawl prevents rotation of the crank handle in a second direction opposite to the first direction and for allowing the crank handle to rotate oppositely to the first direction with the pawl in the second position. The anti-reverse actuator consists of a body with a friction generating surface, structure for mounting the body to the crank assembly in operative position so that the friction generating surface faces axially with respect to the crank shaft axis and the friction generating surface is in sliding frictional engagement with the crank assembly to thereby follow rotation of the crank handle in the first and second directions, and structure on the actuator for engaging the pawl and for moving the pawl from its second position to its first position as an incident of the crank handle rotating in the second direction and for moving the pawl from its first position to its second position as an incident of the crank handle rotating in the first direction. The friction generating surface develops, with the crank assembly, a predetermined frictional force which is overcome upon the pawl being blocked in the second position and a predetermined torque applied to the crank handle tending to rotate the crank handle in the first direction.

17 Claims, 2 Drawing Sheets

U.S. Patent    Jan. 15, 1991    Sheet 2 of 2    4,984,665
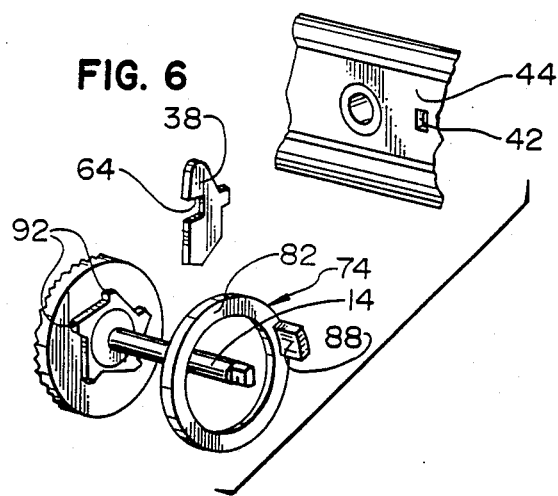
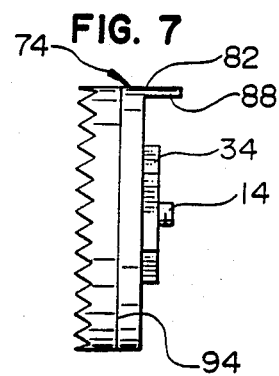
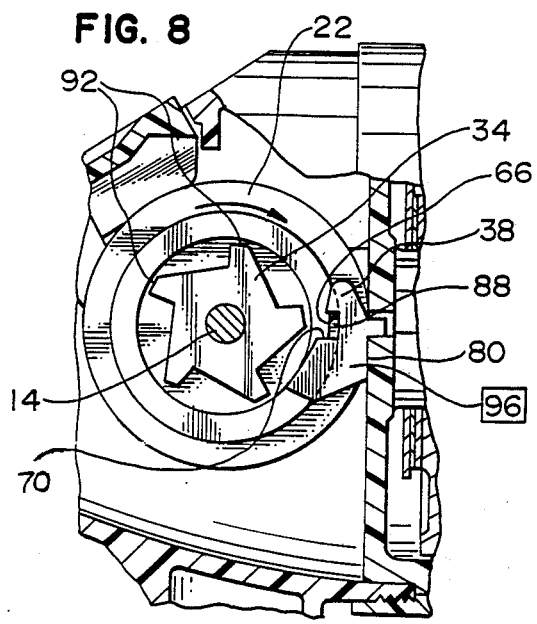
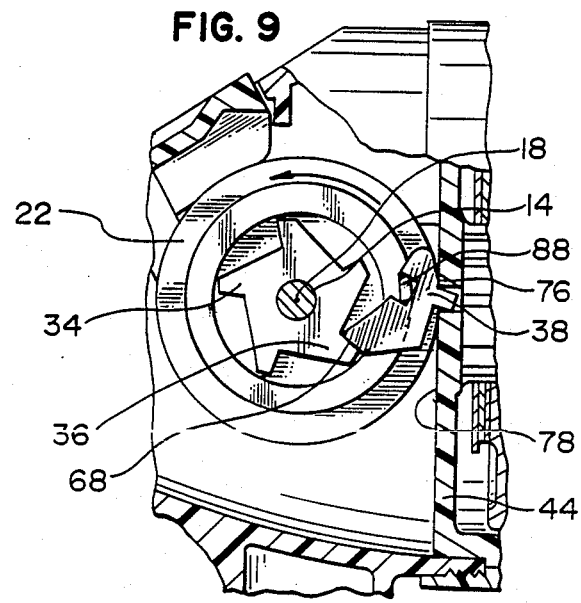
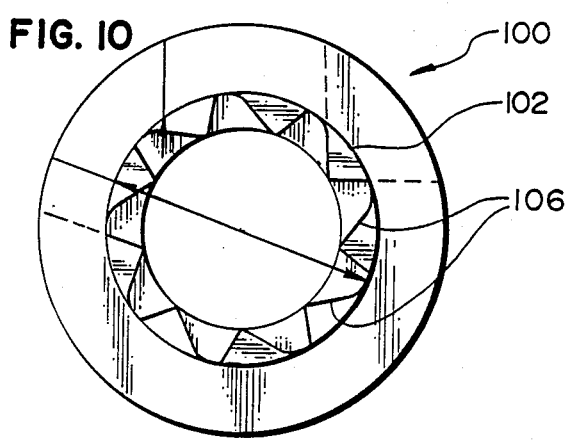
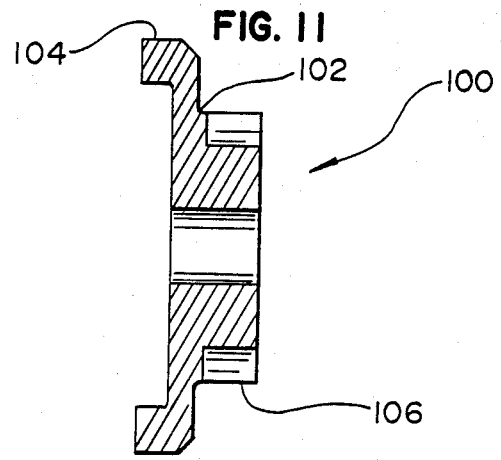

ANTI-REVERSE ACTUATOR FOR A SPINNING REEL

BACKGROUND OF THE INVENTION

1. Field of the Invention

This invention relates to fishing reels and, more particularly, to a structure for permitting unimpeded rotation of a shaft on the reel in a forward direction and for selectively preventing reverse rotation of that shaft.

2. Background Art

Anti-reverse mechanisms for crank shafts on fishing reels are well known in the art. An exemplary prior art structure is shown in U.S. Pat. No. 4,492,347, to Moss. In Moss, a crank handle 332 operates a crank shaft 42, which is in turn geared to a center shaft 251 that rotates a spinner head assembly 242 to direct line onto a spool 131. The crank shaft 42 is supported for rotation relative to a deck plate 21. The deck plate 21 carries a pawl 321, which is pivotable between a first position, shown in FIG. 5, wherein the pawl 321 moves in between and blocks the teeth on a ratchet 336 carried by the shaft 42, and a second position, shown in FIG. 4, wherein the pawl is out of the path of the ratchet 336.

To effect pawl movement, as an incident of the rotation of shaft 42, a pawl actuator 324 is provided. The actuator 324 has a flat body with spaced legs which clamp fit to, and frictionally grip, the shaft 42 with a predetermined force so that the actuator 324 follows both forward and reverse rotation of the shaft 42. The actuator 324 has a tab 327 which engages a notch 328 in the pawl 321 and converts rotary movement of the shaft 42 into pivoting movement of the pawl 321 between its first and second positions.

Clockwise rotation of the crank shaft 42 in FIG. 4 causes pivoting of the pawl to the FIG. 4 position in which position the pawl 321 is blocked by the deck plate 21. Continued rotation of the crank handle 332 with a predetermined torque causes the shaft 42 to overcome the frictional force between the shaft 42 and actuator 324 so that the shaft 42 is rotatable relative to the actuator 324. In the FIG. 5 position, the pawl 321 blocks the ratchet 336 so that reverse rotation of the crank shaft 42 is prohibited.

The above anti-reverse mechanism has proven very effective in operation, however, it nonetheless has certain shortcomings.

One problem that the Moss structure creates is that of compounding tolerances along the axial extent of the crank shaft 42. That is, the face gear 313, ratchet 336, actuator 324, boss 40, etc. must be manufactured to close tolerances to have all the parts in proper operative alignment.

Another drawback with the actuator 324 is that it is a thrust element. Variation in the frictional gripping force of the actuator 324 on the shaft 42 may alter the operation of the anti-reverse mechanism. This may occur through wear on the shaft 42 and/or deformation of the gripping legs on the actuator 324.

SUMMARY OF THE INVENTION

The present invention is specifically directed to overcoming the above enumerated problems in a novel and simple manner.

The present invention comprehends an anti-reverse actuator for a reel of the type having a line carrying spool, a crank assembly consisting of a crank shaft and a handle operable to rotate the crank shaft about an axis, structure responsive to rotation of the crank handle in a first direction for directing line onto the spool, a pawl mounted for movement between first and second positions, structure for blocking the pawl in the first and second positions, and structure on the crank assembly for engaging the pawl in the first position so that the pawl prevents rotation of the crank handle in a second direction opposite to the first direction and for allowing the crank handle to rotate oppositely to the first direction with the pawl in the second position. The anti-reverse actuator consists of a body with a friction generating surface, structure for mounting the body to the crank assembly in operative position so that the friction generating surface faces axially with respect to the crank shaft axis and the friction generating surface is in sliding frictional engagement with the crank assembly to thereby follow rotation of the crank handle in the first and second directions, and structure on the actuator for engaging the pawl and for moving the pawl from its second position to its first position as an incident of the crank handle rotating in the second direction and for moving the pawl from its first position to its second position as an incident of the crank handle rotating in the first direction. The friction generating surface develops, with the crank assembly, a predetermined frictional force which is overcome upon the pawl being blocked in the second position and a predetermined torque applied to the crank handle tending to rotate the crank handle in the first direction.

In a preferred form, the crank assembly includes a face gear with a surface facing axially with respect to the crank shaft axis and cooperating with the friction generating surface on the actuator body.

The pawl engaging structure on the crank assembly consists preferably of a plurality of ratchet teeth associated with the face gear.

The invention contemplates a reduction in the tolerance stack for the elements built up on the crank assembly. To accomplish this, the actuator is preferably a ring-like member which surrounds the ratchet teeth so as to be in axially overlapping relationship therewith and bears frictionally against the flat surface of the face gear. The ring-like body of the actuator has a transverse leg which engages with the pawl in the same manner as the actuator described in the Moss patent, above.

In addition to avoiding the problem of parts tolerances, the present invention allows for facilitated assembly of the actuator. The actuator body can be simply placed over the crank shaft and ratchet teeth, with the latter preferably closely dimensioned thereto so as to guide rotation of the actuator in response to rotation of the crank shaft.

In one form of the invention, a continuous annular shoulder is formed between the face gear and ratchet teeth to smoothly guide rotation of the actuator. This shoulder increases surface contact area with the actuator to avoid possible wear on the ratchet teeth. The shoulder has an axial extent at least equal to the thickness of the actuator.

A viscous substance, such as oil or grease can be placed between the actuator and face gear surface. This oil/grease causes the actuator to be adhered to the face gear in its operative position, to facilitate assembly thereof and also to guide smooth movement of the actuator in rotation. Even light weight oil has been found to operate effectively in the inventive structure.

Preferably, the actuator is made from metal for high durability and long life.

BRIEF DESCRIPTION OF THE DRAWINGS

FIG. 6 is a reduced, exploded, perspective view of an anti-reverse mechanism, with the inventive actuator incorporated therein;

FIG. 7 is an end elevation view of the inventive actuator in assembled relationship with the crank assembly;

FIG. 8 is a fragmentary sectional side view of a reel with the inventive anti-reverse mechanism thereon and in its disengaged position;

FIG. 9 is a view similar to that in FIG. 8 with the anti-reverse mechanism in its engaged position;

FIG. 10 is a side elevation view of a crank assembly according to the present invention and slightly modified from the crank assembly of FIG. 7; and FIG. 11 is an end elevation view of the crank assembly of FIG. 10.

DETAILED DESCRIPTION OF THE DRAWINGS

Figure 1:
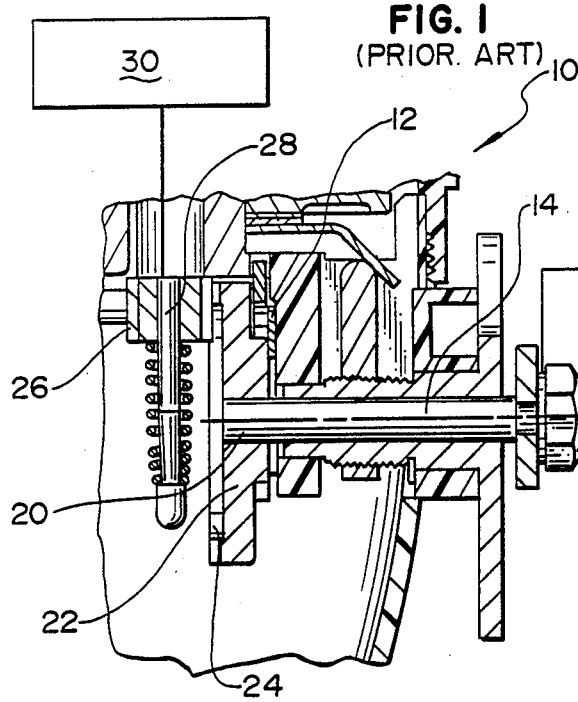
FIG. 1 is a fragmentary, sectional, plan view of a portion of a conventional fishing reel showing a conventional crank assembly and anti-reverse mechanism.
Figure 2:
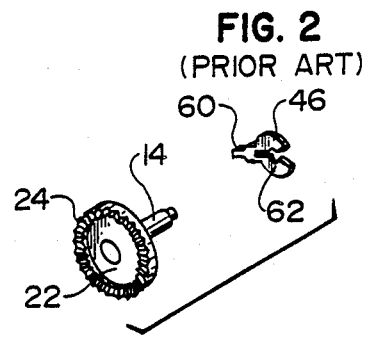
FIG. 2 is a reduced, exploded, perspective view of a crank shaft on the crank mechanism on the reel in FIG. 1, with an associated anti-reverse actuator.
Figure 3:
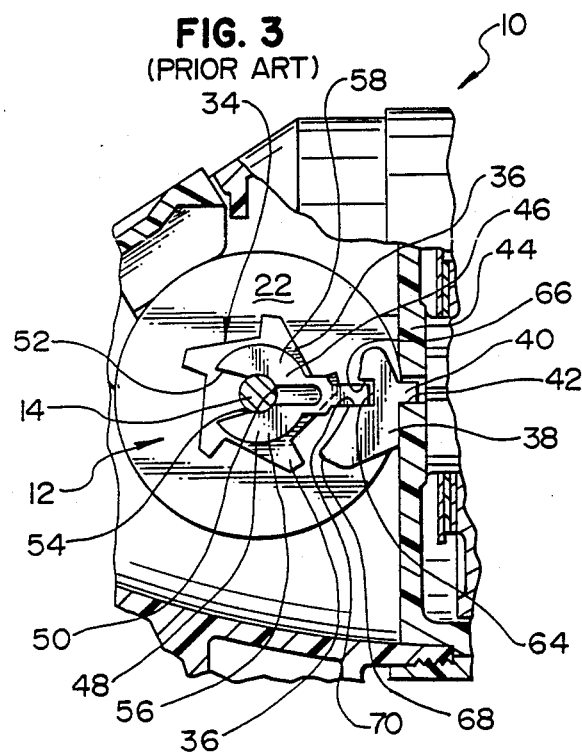
FIG. 3 is a fragmentary side section view of the reel in FIG. 1 showing the crank assembly and anti-reverse mechanism.
Figure 4:
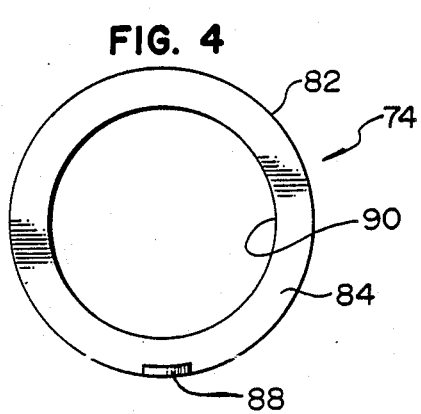
FIG. 4 is an end elevation view of a preferred form of anti-reverse actuator according to the present invention.
Figure 5:
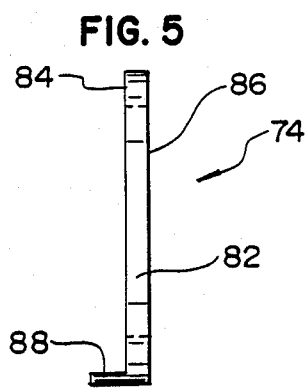
FIG. 5 is a side elevation view of the actuator of FIG. 4.

A prior art reel is shown at 10 in FIGS. 1-3, and has incorporated therein a conventional anti-reverse mechanism at 12 for a crank shaft 14. A crank handle, shown schematically at 16 in FIG. 1, is operated by a user to rotate the crank shaft 14 about a laterally extending axis 18. The crank shaft 14 has, at its inside axial end 20, a face gear 22 keyed to the shaft end 20 to rotate with the shaft 14. The teeth 24 on the face gear 22 are in mesh with a pinion gear 26, which is in turn keyed to rotate with a forwardly extending center shaft 28 but is free to slide axially relative to said shaft 28. The gear 26 and shaft 28 rotate a spinner head assembly, shown schematically at 40 in FIG. 1. The details of the overall reel operation are explained fully in U.S. Pat. No. 4,492,347, to Moss, which is incorporated herein by reference. It suffices to say that rotation of the crank handle 16 in the direction of arrow 32 in FIG. 1, rotates the crank shaft 14, and in turn the center shaft 28 and associated spinner head assembly 30, to thereby direct line onto a spool (not shown).

The anti-reverse mechanism 12 is incorporated to prevent rotation of the crank handle 16 oppositely to the direction of arrow 32, as might inadvertently cause the release of line from the spool. The anti-reverse mechanism 12 consists essentially of a ratchet 34, with circumferentially spaced teeth 36, integrally formed with the face gear 22, a pivotable pawl 38 having a tang 40 extending into an opening 42 in a reel deck plate 44, and an actuator 46.

The actuator 46 has a U-shaped end with a curved seat 50 to closely surround and frictionally engage the periphery of the crank shaft 42. The end 48 of the actuator 46 has an opening 52 at its leading end, which opening progressively decreases, from left to right in FIG. 3, to a width that is slightly less than the diameter of the crank shaft 14.

To assemble the actuator 46, the crank shaft 14 is directed into the actuator opening 52 and forced past the restricted edge 54 of the opening 52. Forcing the shaft 14 into the opening 52 and past the edge 54 causes actuator legs 56, 58 to spread slightly to allow the shaft 14 to snap into the actuator seat 50. The legs 56, 58 spring back upon the shaft 14 moving into the seat 50 and thereby grip the outer periphery of the shaft 14 with a predetermined pressure sufficient to cause the actuator 46 to follow rotation of the shaft 14 about its axis 18.

The actuator 46 has a leg 60 extending at a right angle to the body 62 of the actuator 46. The leg 60 is received in a notch 64 in the pawl 38. As the crank shaft 14 rotates in a counterclockwise/reverse direction in FIG. 3, the leg 60 on the actuator 46 engages the top edge 66 of the pawl 38 to thereby rock the pawl 38 about the tang 40 and effect a clockwise pivoting of the pawl 38 relative to the deck plate 44, which thereby brings the pawl edge 68 into the line of the teeth 36 on the ratchet 34 to thereby block reverse rotation of the shaft 14.

Rotation of the shaft 14 in a clockwise direction in FIG. 3 causes the actuator leg 60 to bear on the bottom edge 70 of the notch 64 in the pawl 38 to thereby move the pawl 38 to the FIG. 3 position wherein the pawl 38 is out of the path of the rotating ratchet teeth 36. With a predetermined torque applied to the crank handle 16 and shaft 14, the frictional gripping force between the actuator 46 and shaft 14 is overcome so that the shaft 14 rotates relative to the actuator 46.

The actuator 74, according to the present invention, is shown in FIGS. 4-9 and, as shown in FIGS. 6, 8 and 9, is intended for use with a pawl 38 and ratchet 34, the same as those shown in FIG. 3. FIG. 9 shows the pawl 38 in a first position wherein the pawl edge 68 blocks one of the ratchet teeth 36 to prevent counterclockwise/reverse rotation of the shaft 14. The pawl has an edge 76, remote from the edge 68, which abuts the rearwardly facing surface 78 of the deck plate 44 to positively block reverse rotation of the shaft 14.

In the disengaged position of FIG. 8, a forward edge 80 of the pawl 38 is blocked by the deck plate surface 78 in its second/disengaged position.

The actuator 74 has a ring-shaped body 82 with oppositely facing flat surfaces 84, 86, and a leg 88 extending at right angles from the surface 84. The body 82 has an inner, annular edge 90 with a diameter slightly larger than the diameter centered on the axis 18 of the shaft 14 and intersecting the radially outwardmost tips 92 of the ratchet teeth 36. As is clearly seen in FIG. 6, the actuator 74 can be slid over the length of the shaft 14 so that the actuator body 82 surrounds the ratchet 34 and is in axially overlapping relationship with the ratchet 34, as seen in FIG. 7.

The actuator surface 86 is a friction generating surface which is facially presented to an axially facing surface 94 on the face gear 22. A viscous material, such as grease, is placed on one or both of the surfaces 86, 94 so that as the actuator 74 is brought into close proximity to the face gear 22, the grease, or the like, causes the actuator 74 to adhere to the face gear surface 94. Many different viscosities of grease and oil operate effectively. It has been found that even lightweight oil works well.

With the actuator 74 in its operative position of FIGS. 7-9, the actuator leg 88 resides within the pawl notch 64. Upon the crank shaft 14 being rotated in a clockwise direction in FIG. 9, the leg 88 bears against the pawl edge 68 to bear the pawl edge 80 against the deck plate 44 to realize the disengaged position of FIG. 8. The adherence between the actuator 74 and face gear 22 is sufficient to cause the actuator 74 to follow movement of the face gear 22 and pivot the pawl 38. However, with the pawl 38 disengaged as in FIG. 8 and a predetermined torque applied to the shaft 14, the frictional force between the actuator 74 and face gear 22 is overcome so that the shaft 14 is free to rotate in the clockwise/forward direction in FIG. 8.

With the face gear 22 rotated in a counterclockwise direction, as in FIG. 9, the leg 88 bears against the top edge 66 of the notch 64 and thereby rocks the pawl 38 from the FIG. 8 position into the FIG. 9 position.

In FIG. 8, a conventional lock for the pawl 38 is shown schematically at 96. It is known to use a rotatable knob or the like to bear the pawl 38 into the FIG. 8 position with a force that is greater than the force capable of being exerted on the pawl 38 by the actuator 74 in a clockwise direction with the pawl 38 in the FIG. 8 position.

A modified form of crank assembly is shown at 100 in FIGS. 10 and 11. The only difference between the crank assembly 100 and that earlier described is that an additional, continuous annular shoulder 102 is provided between a corresponding face gear 104 and ratchet teeth 106. The shoulder 102 preferably has an axial extent at least equal to the thickness of the body 82 on the actuator 74 and engages and guides rotation thereof. This shoulder 102 affords a greater contact area for the actuator 74 than do the ratchet teeth 106 to thereby minimize wear on the crank assembly 100. Further, contact between the actuator 74 and teeth 106 can be altogether eliminated.

It can be seen that the actuator 74 is capable of being readily assembled. The actuator 74 is not a thrust member and thus is not prone to failure as is the corresponding actuator 46 shown in FIGS. 1-3. Still further, the actuator 74 is assembled in such a manner that it does not compound the tolerance problems normally associated with assembling elements along the length of the crank shaft 14.

The foregoing disclosure of specific embodiments is intended to be illustrative of the broad concepts comprehended by the invention.

I claim:

1. An anti-reverse actuator for a reel of the type having a line carrying spool, a crank assembly consisting of a crank shaft and a handle operable to rotate the crank shaft about an axis, means responsive to rotation of the crank handle in a first direction for directing line onto the spool, a pawl mounted for movement between first and second positions, means for blocking the pawl in the second position, and means on the crank assembly for engaging the pawl in the first position so that the pawl prevents rotation of the crank handle in a second direction opposite to the first direction and for allowing the crank handle to rotate opposite to the first direction with the pawl in the second position, said anti-reverse actuator comprising:

a body with a friction-generating surface;

means for mounting the body to the crank assembly in operative position so that the friction generating surface faces axially with respect to the crank shaft axis and the friction generating surface is in sliding frictional engagement with the crank assembly to thereby follow rotation of the crank shaft in said first and second directions, said body having a curved edge facing radially inwardly toward said crank shaft axis and non-biasably engaged with the crank assembly; and means on the actuator for engaging the pawl and for moving the pawl into its first position as an incident of the crank handle rotating in the second direction and for moving the pawl from its first position to its second position as an incident of the crank handle rotating in said first direction, said friction generating surface developing with said crank assembly a predetermined frictional force which is overcome upon said pawl being blocked in the second position and a predetermined torque applied to the crank handle tending to rotate the crank handle in said first direction.

2. The anti-reverse actuator according to claim 1 wherein said crank shaft has a first diameter, the crank assembly includes a face gear with a diameter greater than said first diameter and a surface facing axially with respect to the crank shaft axis and cooperating with the friction generating surface on the actuator body to develop said predetermined friction force, said body edge having an annular configuration with a diameter substantially greater than the first diameter.

3. The anti-reverse actuator according to claim 1 wherein said actuator has a ring-shaped body which surrounds the crank shaft.

4. An anti-reverse actuator for a reel of the type having a line carrying spool, a crank assembly consisting of a crank shaft and a handle operable to rotate the crank shaft about an axis, means responsive to rotation of the crank handle in a first direction for directing line onto the spool, a pawl mounted for movement between first and second positions, means for blocking the pawl in the second position, and means on the crank assembly for engaging the pawl in the first position so that the pawl prevents rotation of the crank handle in a second direction opposite to the first direction and for allowing the crank handle to rotate opposite to the first direction with the pawl in the second position, said anti-reverse actuator comprising:

a body with a friction generating surface;

means for mounting the body to the crank assembly in operative position so that the friction generating surface faces axially with respect to the crank shaft axis and the friction generating surface is in sliding frictional engagement with the crank assembly to thereby follow rotation of the crank shaft in said first and second directions; and means on the actuator for engaging the pawl and for moving the pawl into its first position as an incident of the crank handle rotating in the second direction and for moving the pawl from its first position to its second position as an incident of the crank handle rotating in said first direction, said friction generating surface developing with said crank assembly a predetermined frictional force which is overcome upon said pawl being blocked in the second position and a predetermined torque applied to the crank handle tending to rotate the crank handle in said first direction, wherein the pawl engaging means on the crank assembly comprises a plurality of ratchet teeth and the body of the actuator is in axially overlapping relationship with the ratchet teeth with the actuator in its operative position.

5. The anti-reverse actuator according to claim 2 wherein said axially facing surface on the face gear and the friction generating surface on the actuator body each have an annular configuration.

6. The anti-reverse actuator according to claim 2 wherein grease is interposed between the axially facing face gear surface and the friction generating surface on the actuator to cause releasable adherence between the actuator and the crank assembly.

7. The anti-reverse actuator according to claim 3 wherein the friction generating surface is substantially flat and the ring-shaped body has an integrally formed leg extending transversely to the plane of the friction generating surface.

8. The anti-reverse actuator according to claim 4 wherein a plurality of said ratchet teeth have tips with a first radius centered on the crank shaft axis, the actuator has a ring-shaped body with an inside surface defined by an inside radius and the inside radius is slightly larger than the first radius.

9. The anti-reverse actuator according to claim 4 wherein there is a shoulder between the face gear and ratchet teeth for engaging the guiding rotation of the actuator body.

10. The anti-reverse actuator according to claim 7 wherein said actuator is made from metal.

11. The anti-reverse actuator according to claim 8 wherein the inside body surface frictionally engages a plurality of said ratchet teeth tips with the actuator body in operative position.

12. An anti-reverse mechanism for a rotating shaft, said anti-reverse mechanism comprising:
a plurality of ratchet teeth carried by said shaft;
a support;
a pawl;
means for mounting the pawl to the support for relative movement between (1) a first position wherein the pawl engages at least one of the ratchet teeth to prevent reverse rotation of the rotary shaft and (2) a second position wherein the rotary shaft can rotate forwardly without interference between the pawl and ratchet teeth;
an actuator having a continuous annular configuration surrounding the rotating shaft and a friction generating surface;
mean for mounting the actuator to the shaft so that the friction generating surface faces axially with respect to the shaft axis and the friction generating surface is in sliding frictional engagement with a part of the shaft; and
means on the actuator or engaging the pawl and for moving the pawl from its second position into its first position as an incident of the shaft reversely rotating and for moving the pawl from its first position to its second position as an incident of the shaft rotating in a forward direction.

13. The anti-reverse mechanism according to claim 12 wherein said friction generating surface develops a predetermined frictional force with said shaft, means are provided for blocking the pawl in its second position, and said predetermined frictional force is overcome with the pawl blocked in its second position and a predetermined torque applied to the shaft tending to rotate the shaft in a forward direction.

14. The anti-reverse mechanism according to claim 12 wherein a viscous material is interposed between the friction generating surface on the actuator and the shaft part to releasably hold the actuator against the shaft part.

15. The anti-reverse mechanism according to claim 12 wherein said shaft carries a face gear, said face gear has an axially facing flat surface and the friction generating surface on the actuator engages the flat face gear surface.

16. The anti-reverse mechanism according to claim 12 wherein said friction generating surface is flat and said actuator has a leg projecting at a right angle to the plane of the flat friction generating surface.

17. The anti-reverse mechanism according to claim 14 wherein the viscous material is grease.

* * * * *